United States Patent
Cakulev et al.

(10) Patent No.: US 12,439,280 B2
(45) Date of Patent: Oct. 7, 2025

(54) SYSTEMS AND METHODS FOR USER EQUIPMENT POLICY UPDATES BASED ON RADIO FREQUENCY CONNECTION CHARACTERISTICS

(71) Applicant: Verizon Patent and Licensing Inc., Basking Ridge, NJ (US)

(72) Inventors: Violeta Cakulev, Milburn, NJ (US); Lixia Yan, Basking Ridge, NJ (US); Ali Imdad Malik, East Brunswick, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 357 days.

(21) Appl. No.: 18/309,971

(22) Filed: May 1, 2023

(65) Prior Publication Data
US 2024/0373250 A1 Nov. 7, 2024

(51) Int. Cl.
*H04W 24/02* (2009.01)
*H04W 40/02* (2009.01)
*H04W 76/10* (2018.01)

(52) U.S. Cl.
CPC .......... *H04W 24/02* (2013.01); *H04W 40/02* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 2021/0258868 A1* | 8/2021 | Wong | H04W 4/029 |
| 2022/0191765 A1* | 6/2022 | Ding | H04W 40/24 |
| 2023/0156562 A1* | 5/2023 | Thiebaut | H04W 40/22 370/315 |
| 2023/0189115 A1* | 6/2023 | Shekhar | H04W 48/18 370/329 |
| 2023/0232359 A1* | 7/2023 | Lai | H04W 60/04 370/329 |
| 2023/0276351 A1* | 8/2023 | Tamura | H04W 48/18 455/435.2 |

(Continued)

OTHER PUBLICATIONS

Third Generation Partnership Project, "Technical Specification Group Core Network and Terminals; Common Data Types for Service Based Interfaces; Stage 3 (Release 18)," 3GPP TS 29.571 V18.1.0 (Mar. 2023).

*Primary Examiner* — Bob A Phunkulh

(57) ABSTRACT

A system described herein may receive, from a policy element of a core of a wireless network, a set of triggers associated with a plurality of radio frequency ("RF") bands implemented by a radio access network ("RAN"). The system may identify that a User Equipment ("UE") is connected to the RAN via a first RF band, and may identify a subsequent connection of the UE to the RAN via a second RF band. The system may identify that a particular trigger, of the set of triggers, is satisfied based on the subsequent connection of the UE to the RAN via the second RF band, and may indicate, to the policy element, that the particular trigger has been satisfied. The policy element may output a second set of UE policies for communications between the UE and the core of the wireless network based on the satisfaction of the particular trigger.

20 Claims, 9 Drawing Sheets

(56) References Cited

U.S. PATENT DOCUMENTS

| | | | |
|---|---|---|---|
| 2023/0319533 A1* | 10/2023 | Ly | H04L 43/04 |
| | | | 709/224 |
| 2023/0319681 A1* | 10/2023 | Kiss | H04W 40/36 |
| 2024/0007925 A1* | 1/2024 | Li | H04W 76/15 |
| 2024/0057183 A1* | 2/2024 | Srivastava | H04W 76/15 |
| 2025/0150888 A1* | 5/2025 | Kim | H04W 40/246 |
| 2025/0184261 A1* | 6/2025 | Tamura | H04W 28/084 |

* cited by examiner

301

| UE ID | Source band | Target band |
|---|---|---|
| UE_A | Band_1 | <Any> |
| <Any> | <Any> | Band_2 |
| {UE_Group_A} | <Any> | Band_3 |
| <Any> | Band_2 | Band_1 |
| UE_B | <Any> | <Any> |

| Sequence | Timing |
|---|---|
| Band_1, <Any>, Band_1 | Within 10 seconds |
| Band_2, Band_1, Band_3, Band_4 | Within 30 minutes |

SYSTEMS AND METHODS FOR USER EQUIPMENT POLICY UPDATES BASED ON RADIO FREQUENCY CONNECTION CHARACTERISTICS

BACKGROUND

Wireless networks provide wireless connectivity to User Equipment ("UEs"), such as mobile telephones, tablets, Internet of Things ("IoT") devices, Machine-to-Machine ("M2M") devices, or the like. Such wireless networks may enforce policies related to the UEs, such as Quality of Service ("QoS") parameters for services that the UEs are authorized to receive, Data Network Names ("DNNs") that the UEs are authorized to use, network slices of the wireless network with which the UEs are authorized to communicate, and/or other types of policies.

BRIEF DESCRIPTION OF THE DRAWINGS

FIGS. 3 and 4 illustrate example data structures that may be used in accordance with embodiments described herein;

DETAILED DESCRIPTION OF EXAMPLE EMBODIMENTS

Figure 1:
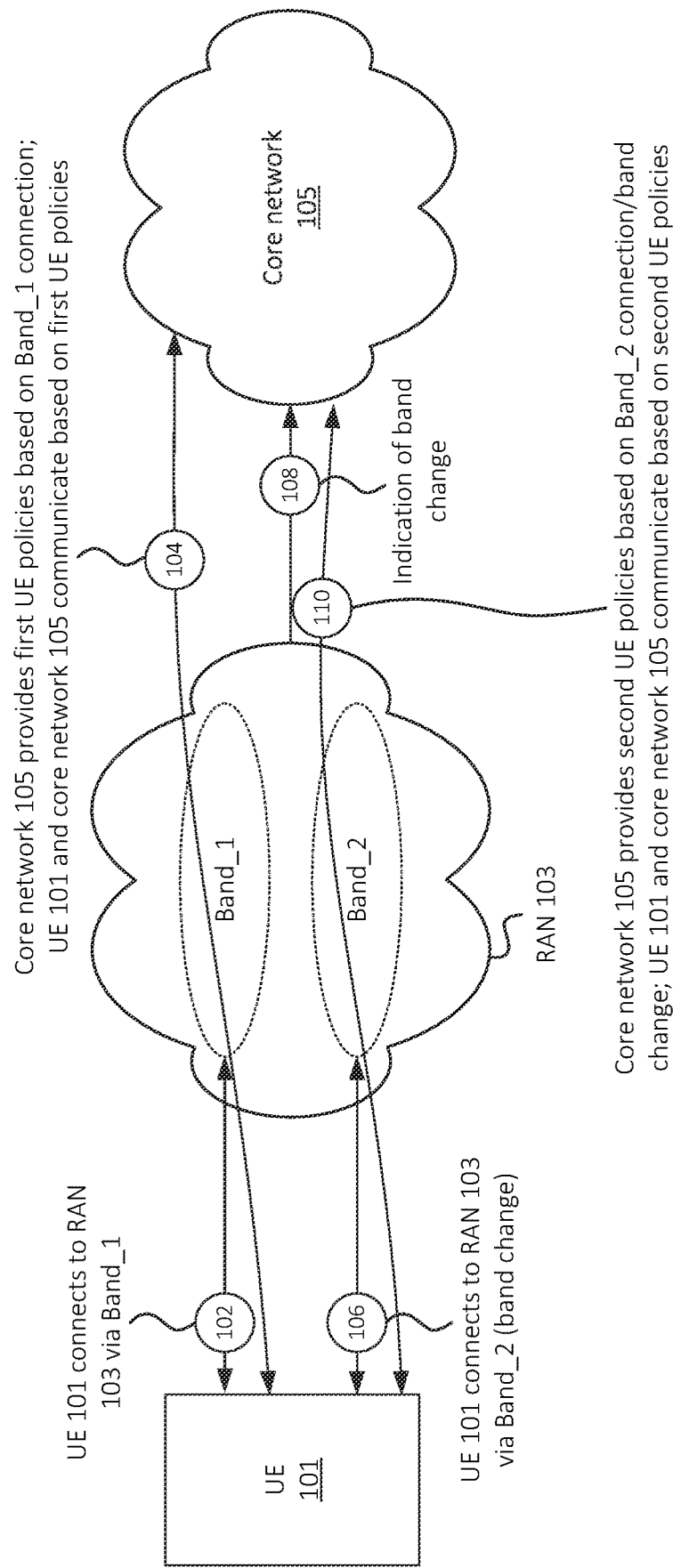
FIG. 1 illustrates an example overview of one or more embodiments described herein.

The following detailed description refers to the accompanying drawings. The same reference numbers in different drawings may identify the same or similar elements.

Embodiments described herein provide for different UE policies based on different characteristics of a wireless connection between UEs and a RAN of a wireless network. Such UE policies may include sets of UE Route Selection Policy ("URSP") rules or other suitable UE-based or UE-implemented rules, conditions, etc. For the sake of simplicity, such UE policies are described herein in the context of URSP rules. However, similar concepts may apply to embodiments in which other types of UE policies are implemented.

A particular URSP rule may include information corresponding particular traffic attributes, traffic types, traffic descriptors, application or service types, or other conditions to network parameters, QoS parameters, routing parameters, or other parameters, such as particular network slices, DNNs, or other types of parameters. For example, one URSP rule may indicate that communication sessions associated with voice call traffic are associated with a first network slice (e.g., a network slice that provides low latency services), while another URSP rule may indicate that communication sessions associated with content streaming traffic are associated with a second network slice (e.g., a network slice that provides high throughput services).

As provided for herein, different sets of URSP rules may be provided for different attributes or characteristics of a radio frequency ("RF") connection (e.g., a wireless connection) between a UE and a RAN. Such attributes or characteristics may include, for example, a radio access technology ("RAT") such as Fifth Generation ("5G") or Long-Term Evolution ("LTE"), an RF band (e.g., a Sub-6 GHz band, a mid-band, a millimeter-wave ("mmWave") band, etc.), or other suitable attributes or characteristics. Further, in some embodiments, the network may monitor changes in such characteristics, such as when the UE connects to a RAN via a second RAT or band after being connected to the RAN via a first RAT or RF band (e.g., is handed over to the second RAT or band, re-selects the second RAT or band, etc.), and may automatically determine and provide updated UE policies to the UE based on monitoring and detecting such changes. For the sake of brevity, RF bands are sometimes referred to herein simply as "bands."

By automatically identifying such changes and providing updated UE policies, the network may be able to enforce different sets of UE policies based on an access type of the UE (e.g., a particular RAT or band). Different UE policies may be used, for example, to provide a particular level of end-to-end QoS commensurate with a particular service type, in a manner that accounts for wireless access parameters. For example, a first UE policy may be associated with a relatively lower latency network slice in situations where a UE is connected to a RAT or band that provides relatively higher latency service, while a second UE policy may be associated with a relatively higher latency network slice in situations where the UE is connected to a RAT or band that provides relatively lower latency service. In other words, a UE policy may be selected to compensate for or otherwise account for QoS characteristics or other characteristics of a RAN to which the UE is connected, in order to preserve or otherwise delivery end-to-end QoS parameters associated with a given service or traffic type.

As shown in FIG. 1, for example, a particular UE 101 may connect (at 102) to a particular RAN 103 via a first band, represented as "Band_1." For example, RAN 103 may include one or more base stations that operate according to multiple bands. For example, the one or more base stations may include discrete antennas, radios, and/or other suitable wireless hardware that provides wireless service according to the multiple bands. Such hardware may be co-located or may be geographically distributed. For example, coverage areas associated with multiple bands may partially or fully overlap in some scenarios, or may be non-overlapping in other scenarios.

As further shown, core network 105 may provide services to UE 101 and/or other suitable devices or systems that are connected to RAN 103, such as routing traffic between UE 101 and one or more networks such as the Internet, application servers, other UEs, etc. Based on the connection of UE 101 to RAN 103 via Band_1, core network 105 may provide (at 104) a first set of UE policies (e.g., a first set of URSP rules or other suitable policies) to UE 101. For example, as discussed below, core network 105 may select the first set of UE policies based on characteristics of the connection between UE 101 and RAN 103, including the particular band (i.e., Band_1, in this example) via which UE 101 is connected to RAN 103. UE 101 and core network 105 may communicate based on the first set of UE policies, which may include UE 101 requesting particular network slices, DNNs, etc. for particular traffic or service types.

Further, as discussed below, one or more elements of RAN 103 and/or core network 105 may maintain trigger information, indicating triggers or conditions under which UE 101 should receive new or updated UE policies. Such triggers or conditions may include, for example, a connection of UE 101 to RAN 103 via a different band or RAT (e.g., a band or RAT change, a handover to a different band or RAT, etc.) than Band_1.

At some point, UE 101 may connect (at 106) to RAN 103 via a different band, such as Band_2. While examples herein are discussed in the context of UE 101 connecting to RAN 103 via different bands (e.g., from Band_1 to Band_2), similar concepts may apply when UE 101 connects to RAN 103 via different RATs or access types (e.g., licensed access types such as LTE or 5G or unlicensed access types such as WiFi). The band change (e.g., the connection at 106 to Band_2) may be the result of UE 101 moving to a different location served by RAN 103, load balancing performed by RAN 103 (e.g., RAN 103 may instruct UE 101 to connect to Band_2 instead of Band_1 in situations where Band_1 is congested), a re-selection procedure performed by UE 101 (e.g., UE 101 may identify that signal strength or other performance metrics associated with Band_2 are stronger or otherwise more favorable than signal strength or other performance metrics associated with Band_1), and/or other scenarios.

Based on the connection of UE 101 to RAN 103 via Band_2 (e.g., the change from Band_1 to Band_2), core network 105 may receive (at 108) an indication of the band change (e.g., from RAN 103). For example, RAN 103 and/or some other suitable device or system may have identified the band change associated with UE 101, and may further identify that such band change is associated with the previously discussed triggers, conditions, etc. provided by core network 105. Based on the band change (e.g., from Band_1 to Band_2), core network 105 may identify and provide (at 110) a second set of UE policies, which may be different from the first set of UE policies initially provided (at 104) based on the connection of UE 101 to RAN 103 via Band_1. For example, core network 105 may identify that the second set of UE policies are associated with the connection between UE 101 and RAN 103 via Band_2. Additionally, or alternatively, core network 105 may identify that the sequence of connections (e.g., the connection (at 102) of UE 101 to RAN 103 via Band_1 and then the subsequent connection (at 106) of UE 101 to RAN 103 via Band_2) is associated with the second set of UE policies. That is, in some scenarios, the sequence of connections via particular bands may indicate or may be associated with some sort of error condition, based on which providing the second set of UE policies may be part of a remedial measure performed in order to remediate or otherwise account for the error condition. UE 101 and core network 105 may accordingly communicate (at 110) according to the second set of UE policies, which may include particular network slices or other types of parameters that are associated with particular traffic types, applications, services, etc.

Figure 2:
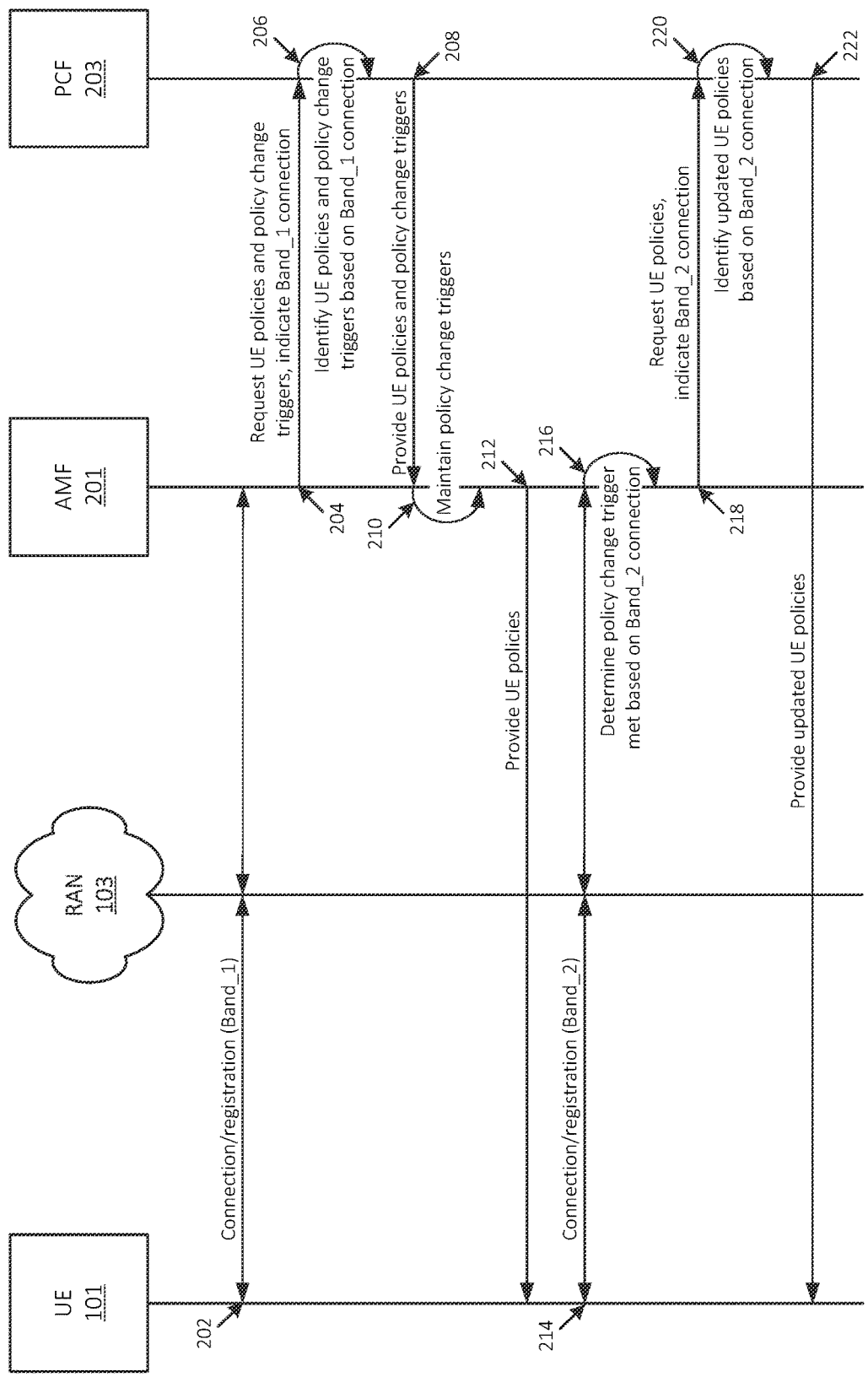
FIG. 2 illustrates an example signal flow for automatically updating UE policies based on band changes associated with a given UE, in accordance with some embodiments.

FIG. 2 illustrates an example signal flow associated with automatically determining and providing UE policies based on a band change associated with UE 101. As shown, UE 101 may connect (at 202) to RAN 103 via Band_1. The connection (at 202) may include a registration or other suitable procedure with an access control function associated with RAN 103, such as Access and Mobility Management Function ("AMF") 201. As part of the registration procedure, AMF 201 may authenticate UE 101, verify that UE 101 is authorized to access RAN 103 (e.g., via Band_1), and/or may perform other suitable operations.

Further, as shown and based on the connection of UE 101 to RAN 103, AMF 201 may request (at 204) UE policies and/or other suitable information from a policy element of core network 105, such as Policy Control Function ("PCF") 203. For example, AMF 201 may output an Npcf_UEPolicyControl_Create message to PCF 203. In some embodiments, AMF 201 may request (at 204) a set of triggers or conditions in conjunction with the request for UE policies, and/or may request such triggers or conditions in a separate message (or set of messages) from the request for UE policies. In some embodiments, the Npcf_UEPolicyControl_Create message may include a parameter, field, flag, etc. indicating that AMF 201 is requesting the set of triggers or conditions. Additionally, or alternatively, PCF 203 may automatically identify the set of triggers or conditions based on receiving the request for UE policies (e.g., the request may, in some embodiments, not include an explicit request for such triggers or conditions). As discussed above, the triggers or conditions may be triggers or conditions relating to UE access of RAN 103, such as a change from the current band (i.e., Band_1) to another band, or may otherwise include the connection of UE to RAN 103 via some other band. As noted above, similar concepts may apply in scenarios where UE 101 access RAN 103 via a different RAT or access type.

In some embodiments, the request (at 204), which may include a Npcf_UEPolicyControl_Create message or other suitable message, may indicate the particular access parameters associated with UE 101 and RAN 103 (i.e., the connection of UE 101 to RAN 103 via Band_1, in this example). In some embodiments, the request (at 204) may include other suitable information, such as an identifier of UE 101 (e.g., a Subscription Permanent Identifier ("SUPI"), a Globally Unique Temporary Identifier ("GUTI"), an International Mobile Station Equipment Identity ("IMEI"), a Mobile Directory Number ("MDN"), etc.), location information of UE 101, a cell identifier indicating a particular cell or base station of RAN 103 to which UE 101 is connected, or other suitable information.

PCF 203 may identify (at 206) a set of UE policies based on the request. For example, PCF 203 may obtain the policy information, or may derive the policy information based on information received from a Unified Data Repository ("UDR"), a Charging Function ("CHF"), a Network Data Analytics Function ("NWDAF"), or other suitable device or system. In some embodiments, a UE-PCF, which may be a subsystem of PCF 203 and/or may otherwise be communicatively coupled to PCF 203 or AMF 201, may identify (at 206) or obtain the UE policy information. For example, PCF 203 may identify UE policies (e.g., URSP rules or other suitable policies) that are applicable to UE 101 when UE 101 is connected to RAN 103 via Band_1. PCF 203 may further identify triggers or conditions based on the indicated connection of UE 101 to RAN 103 via Band_1. For example, the triggers or conditions may include a band change from Band_1 to any other band, a band change from Band_1 to one or more specific bands (e.g., Band_2 or some other particular band), a band change from any band (e.g., Band_1, in this instance) to any other band, a band change from any band to a specific band, etc. As noted above, the triggers or conditions may include a sequence of band changes, such as a band change from Band_1 to Band_2, a sequence of band changes from Band_1 to Band_2 and then to another band, etc.

PCF 203 may provide (at 208) the identified UE policies (e.g., URSP rules or other suitable UE policies) to AMF 201. PCF 203 may also provide (at 208) the identified triggers or conditions to AMF 201, which may maintain (at 210) the triggers or conditions. In some embodiments, PCF 203 may provide the UE policies and/or the triggers or conditions via a response to the Npcf_UEPolicyControl_Create message, such as a "201 Created" Hypertext Transfer Protocol ("HTTP") message or other suitable message confirming or acknowledging the request for UE information and/or for triggers or conditions. In some embodiments, PCF 203 may provide the triggers or conditions in a separate message, or set of messages, from the requested UE policies. For example, in some embodiments, PCF 203 may provide the triggers with, or in conjunction with, the confirmation or acknowledgement of the request (at 204) for UE policy information, while PCF 203 may provide the actual UE policies via some other type of message. In some embodiments, for example, PCF 203 may provide the requested UE policies via a N1N2 Message to AMF 201, based on which AMF 201 may forward (at 212) the UE policies to UE 101.

FIGS. 3 and 4 illustrate example data structures 301 and 401, respectively, that may be maintained by AMF 201 in accordance with some embodiments, in order to maintain (e.g., at 210) triggers and/or conditions under which new or updated UE policy information should be requested. In some embodiments, AMF 201 may maintain additional or different data structures or other types of information associated with such triggers and/or conditions. In some embodiments, AMF 201 may store data structures 301 and 401 (e.g., the usage of data structure 301 may not be mutually exclusive with data structure 401 and/or other data structures).

As shown in FIG. 3, data structure 301 may include different triggers or conditions for different UEs 101 or groups of UEs 101 (e.g., where a "group" may refer to multiple specified UEs 101, UEs 101 that are associated with a particular group or label such as "first responder" or "enterprise," UEs 101 that are associated with a particular device type such as mobile telephone or IoT device, etc.). For example, different UEs 101 may be associated with different triggers based on which updated UE policy information should be requested. On the other hand, in some embodiments, some or all such triggers may be "universal," inasmuch as some or all of the triggers may apply to all UEs 101. The example triggers shown in data structure 301 may indicate the connection via a particular specified band (or any band) after being connected to another specified band (or any band).

In this example, a first UE 101 (represented as "UE_A") may be associated with a first set of triggers, such as the connection to RAN 103 via any band (denoted as "<Any>") after being connected to RAN 103 via a specified band (i.e., Band_1, in this example). That is, if UE_A is connected to RAN 103 via Band_1 and then connects to any other band, this trigger may be satisfied.

As another example, data structure 301 may indicate a trigger that is satisfied if any UE 101 connects to RAN 103 via Band_2 after being connected via any other band. As further shown, data structure 301 may indicate a trigger that is satisfied if any UE 101 of a specified group (shown as "{UE_Group_A}") connects to RAN 103 via Band_3 after being connected via any other band. As yet another example, data structure 301 may indicate a trigger that is satisfied if any UE 101 connects to RAN 103 via Band_1 after being connected via Band_2. As another example, data structure 301 may indicate a trigger that is satisfied UE_B connects to RAN 103 via any band after being connected via another other band (e.g., any band change associated with UE_B).

In some embodiments, data structure 301 may include additional or different information than is discussed above. For example, in some embodiments, data structure 301 may include an identifier for each trigger. As discussed below, such identifier may be used to identify a set of updated UE policies when particular respective triggers are satisfied.

FIG. 4 illustrates example data structure 401, which may indicate triggers that include sequences of band changes. As similarly noted above, data structure 401 may be maintained on a per-UE or a per-UE group basis. For the sake of simplicity, data structure 401 is discussed without regard to whether the triggers indicated in data structure 401 are specific to any particular UE 101 or UE group. As shown, data structure 401 indicates that a trigger may be satisfied based on a sequence of a given UE 101 connecting to RAN 103 via Band_1, then any other band, and then Band_1 again. Further, data structure 401 may indicate that the trigger is satisfied if such sequence occurs within 10 seconds. Such a sequence may indicate a "ping pong" scenario, in which UE 101 is handed back and forth to and from the same band. For example, particular sets of updated UE policies may be used to remediate factors that would lead to the occurrence of such scenarios.

As another example, data structure 401 may indicate that a trigger is satisfied if a particular UE 101 connects to RAN 103 via Band_2, then Band_1, then Band_3, then Band_4 within a 30-minute timeframe. In practice, data structure 401 may indicate other sequences, timeframes, or other suitable information based on which triggers may be satisfied. As similarly noted above, data structure 401 may include identifiers for each trigger, which may be used to identify particular UE policies in response to the occurrence of such triggers.

Returning to FIG. 2, based on receiving (at 212) the UE policies, UE 101 may communicate with core network 105 in accordance with the UE policies. For example, UE 101 may request the establishment of one or more communication sessions, such as protocol data unit ("PDU") sessions, between UE 101 and one or more elements of core network 105 (e.g., a User Plane Function ("UPF"), a Packet Data Network ("PDN") Gateway ("PGW"), or other suitable network element) based on the UE policies. Such establishment may include, for example, UE 101 identifying particular network slices, DNNs, or other suitable parameters associated with particular types or services of traffic to be communicated via the communication sessions, and requesting that the communication sessions be associated with such network slices, DNNs, etc. UE 101 may additionally, or alternatively, route particular traffic (e.g., matching particular attributes, descriptors, etc.) via respective communication sessions that are associated with particular network slices, DNNs, etc. based on the UE policies.

As further shown, at some point after the connection (at 202) of UE 101 to RAN 103, UE 101 may connect (at 214) to RAN 103 via a different band (i.e., Band_2, in this example). For example, as discussed above, UE 101 may perform a re-selection procedure to identify that UE 101 should connect via Band_2, may move to a location at which Band_2 is available and Band_1 is not available, may be handed off by a base station of RAN 103 from Band_1 to Band_2, etc. In some embodiments, UE 101 may register (at 214) with AMF 201, and/or AMF 201 may otherwise determine that UE 101 has connected to RAN 103 via Band_2 (e.g., UE 101 and/or a base station of RAN 103 may notify AMF 201 of the connection via Band_2).

Further, AMF 201 may determine (at 216) that a particular trigger (e.g., as discussed above with respect to data structures 301 and 401, and/or some other suitable trigger maintained at 210) has been satisfied based on the connection of UE 101 to RAN 103 via Band_2 after being connected via Band_1. For example, AMF 201 may determine that the sequence of connection via Band_1 and then Band_2 satisfies a particular trigger, that the band change from Band_1 satisfies a particular trigger, that the band to Band_2 satisfies a particular trigger, etc.

Based on determining (at 216) that the trigger has been satisfied, AMF 201 may request (at 218) UE policies associated with UE 101. In some embodiments, AMF 201 may indicate, to PCF 203, that one or more triggers have been satisfied. For example, in some embodiments, AMF 201 may indicate a particular identifier of a particular trigger that has been satisfied. In some embodiments, AMF 201 may indicate a particular sequence of bands via which UE 101 has been connected (e.g., the last two bands, the last three bands, all bands via which UE 101 has been connected over the last 30 minutes, etc.). Such sequence may be, in this example, Band_1 and then Band_2. In some embodiments, the request (at 218) may include a Npcf_UEPolicyControl_Update message. In some embodiments, the Npcf_UEPolicyControl_Update message may include some or all of the above-mentioned information (e.g., an identifier of a particular trigger that has been met, a sequence of bands via which UE 101 has been connected, etc.). Additionally, or alternatively, the Npcf_UEPolicyControl_Update message may be provided in addition to one or more other messages that include some or all of the above-mentioned information.

In some embodiments, AMF 201 may forgo indicating, to PCF 203, that any triggers have been satisfied. In such embodiments, from the standpoint of PCF 203, the request (at 218) may be irrespective of the satisfaction of any triggers, and may instead be considered as a request for policy information based on the connection of UE 101 to RAN 103 via Band_2. In some embodiments, AMF 201 may again request (at 218) a set of triggers (e.g., as similarly discussed above at 204). Additionally, or alternatively, AMF 201 may forgo requesting (at 218) trigger information, as the previously received (at 204) triggers may remain applicable.

PCF 203 may identify (at 220) updated UE policies based on the connection of UE 101 via Band_2. For example, PCF 203 may identify updated UE policies that are associated with the connection of UE 101 via Band_2, may identify updated UE policies based on the sequence of bands via which UE 101 has been connected to RAN 103, may identify updated UE policies based on a particular trigger identifier that has been provided by AMF 201, and/or may otherwise identify updated UE policies based on receiving the indication (at 218) that one or more triggers have been satisfied. As discussed above, the identified (at 220) UE policies may be determined in order to remediate one or more abnormal or performance-degrading conditions that are associated with particular triggers.

PCF 203 may accordingly provide (at 222) the updated UE policies to UE 101. As discussed above, the updated UE policies may be provided via AMF 201, such as via an N1N2 message (including the UE policies) provided to AMF 201, which may forward the UE policies to UE 101 via RAN 103. UE 101 and core network 105 may communicate in accordance with the updated UE policies. For example, UE 101 may request and/or otherwise participate in communication sessions that are associated with QoS parameters, network slices, DNNs, etc. indicated by the updated UE policies.

In the event that PCF 203 identifies (at 220) updated trigger information, PCF 203 may also provide such updated trigger information to AMF 201, which may maintain the updated trigger information and continue to monitor band changes or other information associated with UE 101 in order to determine whether any triggers (e.g., in the updated trigger information or the original trigger information, as applicable) have been met.

Figure 5:
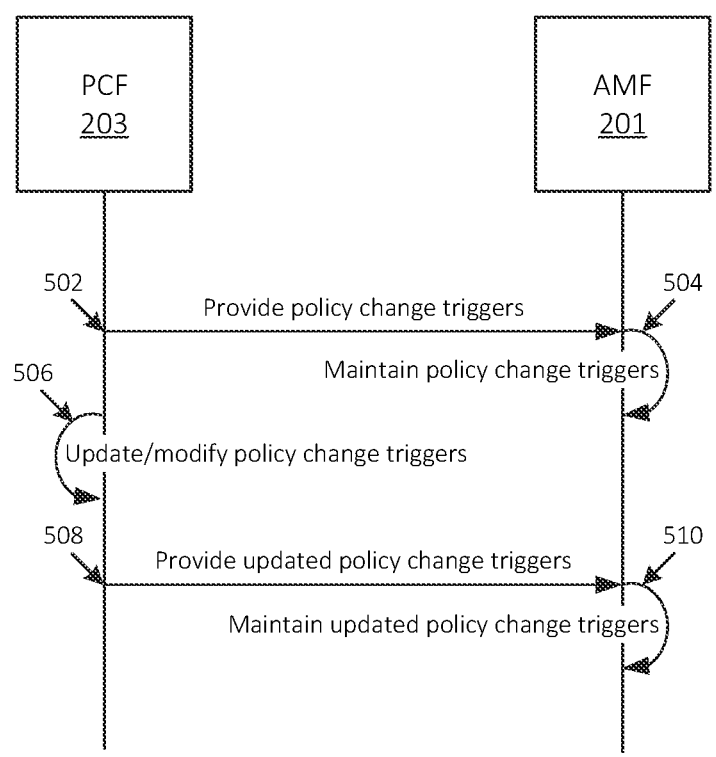
FIG. 5 illustrates an example of updating band-based triggers, in accordance with some embodiments.

As shown in FIG. 5, PCF 203 may receive updates to triggers based on which AMF 201 should request new UE policy information, and may provide such updated triggers to AMF 201. For example, assume PCF 203 provides (at 502) a set of policy change triggers to AMF 201 (e.g., as similarly described above at 208), and AMF 201 maintains (at 504) the received policy change triggers (e.g., as similarly described above at 210). At some point, PCF 203 may update and/or modify (at 506) some or all of the policy change triggers. For example, a network operator associated with core network 105 may provide updated policy change triggers, another network element of core network 105 may provide the updated policy change triggers, PCF 203 may automatically modify the policy change triggers (e.g., using artificial intelligence/machine learning ("AI/ML") techniques or other suitable techniques), and/or the policy change triggers may be updated or modified in some other manner.

PCF 203 may provide (at 508) the updated policy change triggers to AMF 201. For example, PCF 203 may "push" the updated policy change triggers to AMF 201 (e.g., without an explicit request for the updated policy change triggers), or PCF 203 may provide the updated policy change triggers in response to a request from AMF 201 for policy change triggers. AMF 201 may accordingly maintain (at 510) the updated policy change triggers, and may monitor connections associated with one or more UEs 101 to determine whether any of such updated policy change triggers are satisfied. As the policy change triggers are maintained by AMF 201 (e.g., as maintained at 504 and/or 510), particular UEs 101 may not need to receive updated policy change triggers, thereby reducing network traffic and load as compared to implementations in which UEs 101 maintain such trigger information.

Figure 6:
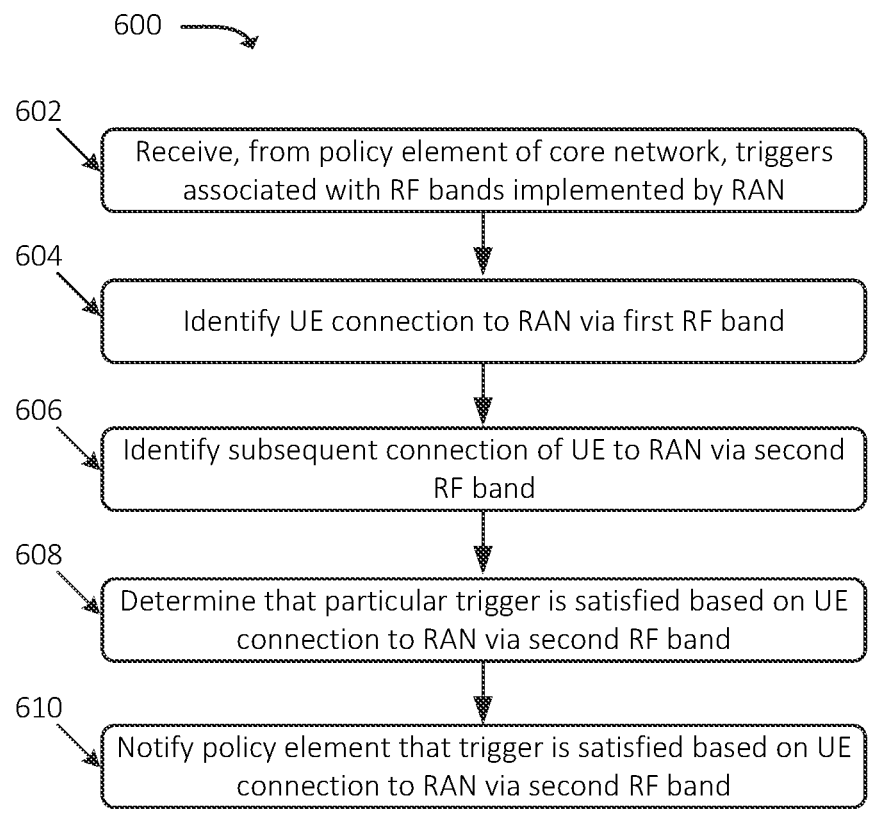
FIG. 6 illustrates an example process for automatically updating UE policies based on band changes associated with a given UE, in accordance with some embodiments.

FIG. 6 illustrates an example process 600 for obtaining updated UE policy information based on band-related triggers (e.g., band changes) associated with a particular UE 101. In some embodiments, some or all of process 600 may be performed by AMF 201.

As shown, process 600 may include receiving (at 602), from a policy element of a core of a wireless network (e.g., PCF 203 of core network 105), triggers associated with RF bands implemented by a RAN of the wireless network (e.g., RAN 103). For example, AMF 201 may request the triggers from PCF 203 based on identifying (at 604) that a particular UE 101 has connected to RAN 103. Additionally, or alternatively, PCF 203 may push the triggers to AMF 201, or AMF 201 may receive such triggers in some other manner. As discussed above, AMF 201 may request the triggers via an Npcf_UEPolicyControl_Create message, an Npcf_UEPolicyControl_Update message, or other suitable message. In some embodiments, as discussed above, PCF 203 may identify particular triggers that are associated with particular UEs 101, and may provide such particular triggers to AMF 201 based on an indication by AMF 201 of a connection associated with a particular UE 101 (e.g., via the first RF band).

Process 600 may additionally include identifying (at 606) a subsequent connection of UE 101 to RAN 103 via a second RF band. For example, AMF 201 may identify that UE 101 has been handed over to the second RF band, that UE 101 has requested a connection via the second RF band, etc.

Process 600 may also include determining (at 608) that a particular trigger, of the received band-related triggers, has been satisfied based on the connection of UE 101 via the second RF band. For example, as discussed above, AMF 201 may identify that a sequence of bands, via which UE 101 has connected to RAN 103, matches a sequence specified in the band-related triggers. Additionally, or alternatively, AMF 201 may otherwise identify that the particular trigger has been satisfied.

Process 600 may further include notifying (at 610) the policy element (e.g., PCF 203) that the particular trigger has been satisfied. The notification may include a request to provide updated UE policies (e.g., updated URSP rules) to UE 101. As discussed above, the updated UE policies may be selected by PCF 203 based on the connection of UE 101 to RAN 103 via the second band, based on a sequence of bands via which UE 101 has connected to RAN 103, and/or other suitable factors. UE 101 may update locally stored URSP rules based on the received updated UE policies, based on which UE 101 may communicate with core network 105 (e.g., a UPF, a PGW, etc.) in accordance with the updated URSP rules.

Figure 7:
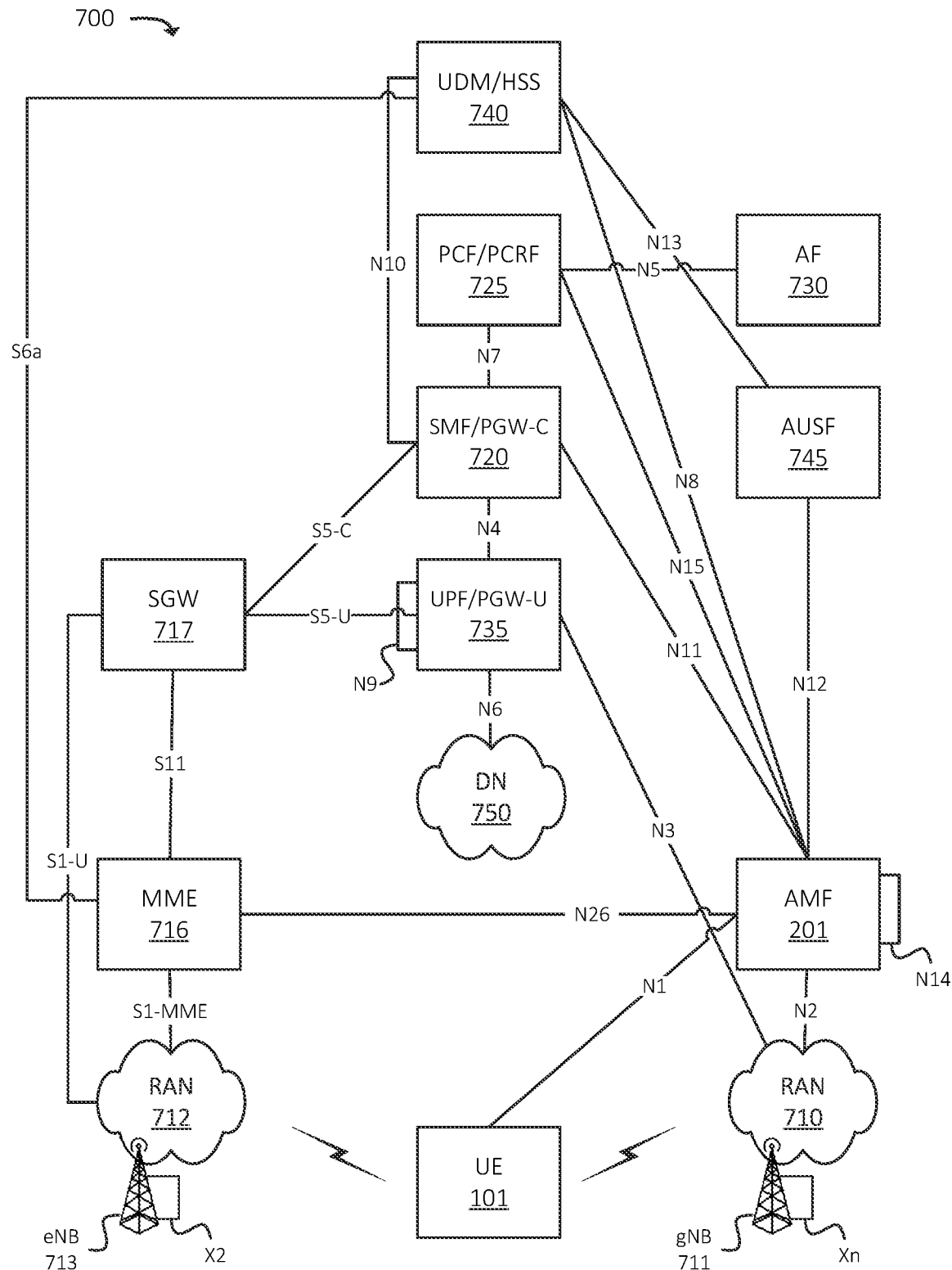
FIGS. 7 and 8 illustrate example environments in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G RAT may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 101, RAN 710 (which may include one or more Next Generation Node Bs ("gNBs") 711), RAN 712 (which may include one or more evolved Node Bs ("eNBs") 713), and various network functions such AMF 201, Mobility Management Entity ("MME") 716, Serving Gateway ("SGW") 717, Session Management Function ("SMF")/PGW-Control plane function ("PGW-C") 720, PCF/Policy Charging and Rules Function ("PCRF") 725, Application Function ("AF") 730, UPF/PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750).

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 201, SMF/PGW-C 720, PCF/PCRF 725, and/or UPF/PGW-U 735, while another slice may include a second instance of AMF 201, SMF/PGW-C 720, PCF/PCRF 725, and/or UPF/PGW-U 735). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 700 may be, may include, may be implemented by, and/or may be communicatively coupled to RAN 103 and/or core network 105.

UE 101 may include a computation and communication device, such as a wireless mobile communication device that is capable of communicating with RAN 710, RAN 712, and/or DN 750. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 101 may communicate with one or more other elements of environment 700. UE 101 may communicate with RAN 710 via an air interface (e.g., as provided by gNB 711). For instance, RAN 710 may receive traffic (e.g., user plane traffic such as voice call traffic, data traffic, messaging traffic, etc.) from UE 101 via the air interface, and may communicate the traffic to UPF/PGW-U 735 and/or one or more other devices or networks. Further, RAN 710 may receive signaling traffic, control plane traffic, etc. from UE 101 via the air interface, and may communicate such signaling traffic, control plane traffic, etc. to AMF 201 and/or one or more other devices or networks. Additionally, RAN 710 may receive traffic intended for UE 101 (e.g., from UPF/PGW-U 735, AMF 201, and/or one or more other devices or networks) and may communicate the traffic to UE 101 via the air interface. In some embodiments, RAN 103 may be, may include, and/or may be implemented by RAN 710.

RAN 712 may be, or may include, a LTE RAN that includes one or more base stations (e.g., one or more eNBs 713), via which UE 101 may communicate with one or more other elements of environment 700. UE 101 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 101 via the air interface, and may communicate the traffic to UPF/PGW-U 735 (e.g., via SGW 717) and/or one or more other devices or networks. Further, RAN 712 may receive signaling traffic, control plane traffic, etc. from UE 101 via the air interface, and may communicate such signaling traffic, control plane traffic, etc. to MME 716 and/or one or more other devices or networks. Additionally, RAN 712 may receive traffic intended for UE 101 (e.g., from UPF/PGW-U 735, MME 716, SGW 717, and/or one or more other devices or networks) and may communicate the traffic to UE 101 via the air interface. In some embodiments, RAN 103 may be, may include, and/or may be implemented by RAN 712.

AMF 201 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 710 and/or gNBs 711, and/or to perform other operations. In some embodiments, the 5G network may include multiple AMFs 201, which communicate with each other via the N14 interface (denoted in FIG. 7 by the line marked "N14" originating and terminating at AMF 201).

MME 716 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 101. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725). In some embodiments, PCF 203 may implement, may be implemented by, may be communicatively coupled to, and/or may otherwise be associated with PCF/PCRF 725.

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 101, from DN 750, and may forward the user plane data toward UE 101 (e.g., via RAN 710, SMF/PGW-C 720, and/or one or more other devices). In some embodiments, multiple UPFs 735 may be deployed (e.g., in different geographical locations), and the delivery of content to UE 101 may be coordinated via the N9 interface (e.g., as denoted in FIG. 7 by the line marked "N9" originating and terminating at UPF/PGW-U 735). Similarly, UPF/PGW-U 735 may receive traffic from UE 101 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 101.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 101 may communicate, through DN 750, with data servers, other UEs 101, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 101 may communicate.

Figure 8:
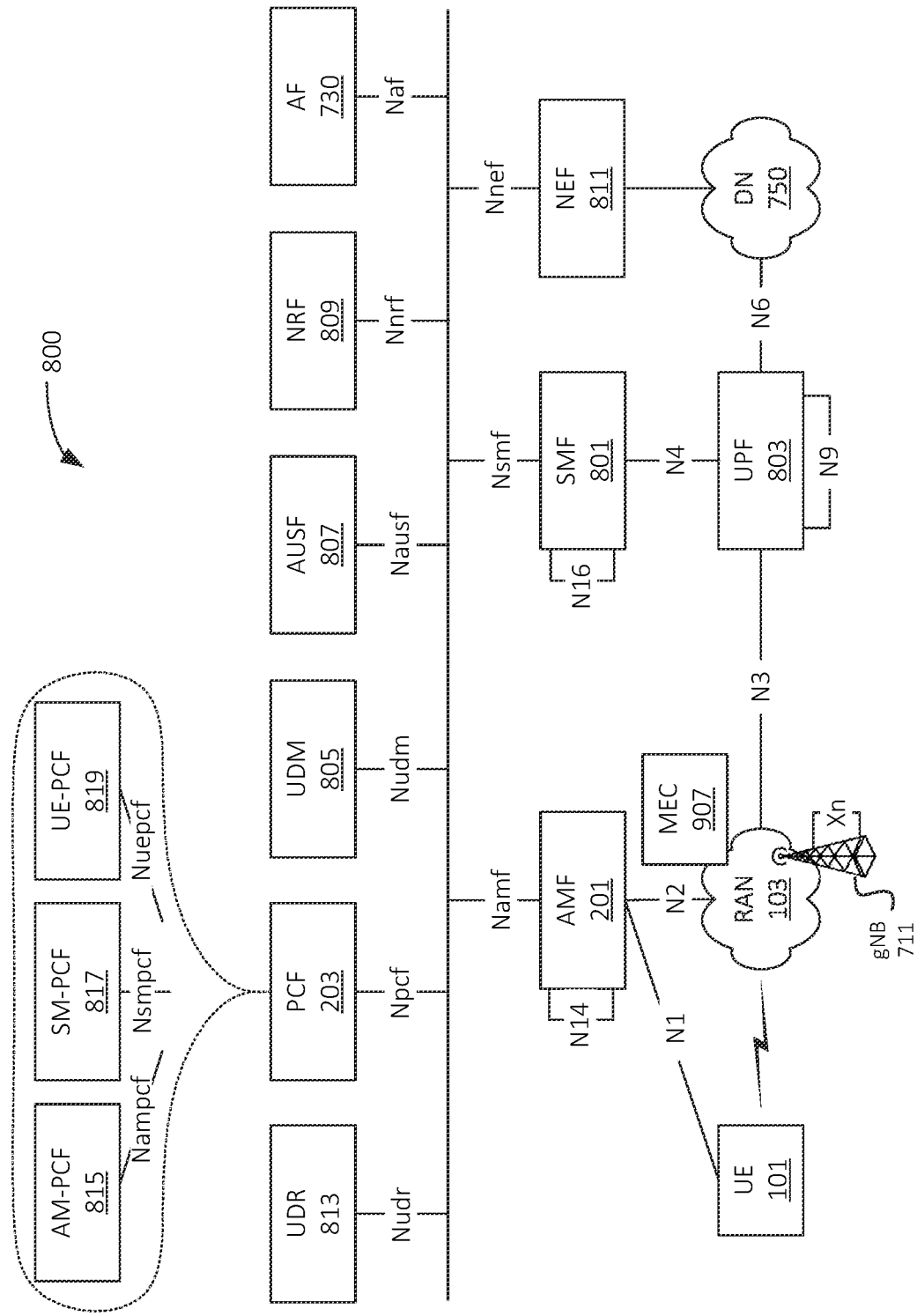

FIG. 8 illustrates another example environment 800, in which one or more embodiments may be implemented. In some embodiments, environment 800 may correspond to a 5G network, and/or may include elements of a 5G network. In some embodiments, environment 800 may correspond to a 5G SA architecture, or may correspond to a 5G NSA architecture. In some embodiments, environment 800 may include a 5GC, in which 5GC network elements perform one or more operations described herein.

As shown, environment 800 may include UE 101, RAN 103 (which may include one or more gNBs 711) and various network functions, which may be implemented as VNFs, CNFs, etc. Such network functions may include AMF 201, SMF 801, UPF 803, PCF 203, UDM 805, AUSF 807, Network Repository Function ("NRF") 809, AF 730, Network Exposure Function ("NEF") 811, and UDR 813. Environment 800 may also include or may be communicatively coupled to one or more networks, such as DN 750.

The example shown in FIG. 8 illustrates one instance of each network component or function (e.g., one instance of SMF 801, UPF 803, PCF 203, UDM 805, AUSF 807, etc.). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF 801, PCF 203, UPF 803, etc., while another slice may include a second instance of SMF 801, PCF 203, UPF 803, etc.). Additionally, or alternatively, one or more of the network functions of environment 800 may implement multiple network slices. The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include interfaces shown in FIG. 8 and/or one or more interfaces not explicitly shown in FIG. 8. These interfaces may include interfaces between specific network functions, such as an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N16 interface, an N26 interface, and/or one or more other interfaces. In some embodiments, one or more elements of environment 800 may communicate via a service-based architecture ("SBA"), in which a routing mesh or other suitable routing mechanism may route communications to particular network functions based on interfaces or identifiers associated with such network functions. Such interfaces may include or may be referred to as Service-Based Interfaces ("SBIs"), including an Namf interface (e.g., indicating communications to be routed to AMF 201), an Nudm interface (e.g., indicating communications to be routed to UDM 805), an Npcf interface, an Nupf interface, an Nnef interface, an Nsmf interface, an Nnrf interface, an Naf interface, and/or one or more other SBIs.

UPF 803 may include one or more devices, systems, VNFs, CNFs, etc., that receive, route, process, and/or forward traffic (e.g., user plane traffic). As discussed above, UPF 803 may communicate with UE 101 via one or more communication sessions, such as PDU sessions. Such PDU sessions may be associated with a particular network slice or other suitable QoS parameters, as noted above. UPF 803 may receive downlink user plane traffic (e.g., voice call traffic, data traffic, etc. destined for UE 101) from DN 750, and may forward the downlink user plane traffic toward UE 101 (e.g., via RAN 103). In some embodiments, multiple UPFs 803 may be deployed (e.g., in different geographical locations), and the delivery of content to UE 101 may be coordinated via the N9 interface. Similarly, UPF 803 may receive uplink traffic from UE 101 (e.g., via RAN 103), and may forward the traffic toward DN 750. In some embodiments, UPF 803 may communicate (e.g., via the N4 interface) with SMF 801, regarding user plane data processed by UPF 803 (e.g., to provide analytics or reporting information, to receive policy and/or authorization information, etc.).

PCF 203 may include one or more devices, systems, VNFs, CNFs, etc., that aggregate, derive, generate, etc. policy information associated with the 5GC and/or UEs 101 that communicate via the 5GC and/or RAN 103. PCF 203 may receive information regarding policies and/or subscriptions from one or more sources, such as subscriber databases (e.g., UDM 805, UDR 813, etc.), and/or from one or more users such as, for example, an administrator associated with PCF 203. In some embodiments, the functionality of PCF 203 may be split into multiple network functions, such as access and mobility PCF ("AM-PCF") 815, session management PCF ("SM-PCF") 817, UE PCF ("UE-PCF") 819, and so on. Such different "split" PCFs may be associated with respective SBIs (e.g., the AM-PCF may be associated with an Nampcf SBI, the SM-PCF may be associated with an Nsmpcf SBI, the UE-PCF may be associated with an Nuepcf SBI, and so on) via which other network functions may communicate with the split PCFs. The split PCFs may maintain information regarding policies associated with different devices, systems, and/or network functions.

NRF 809 may include one or more devices, systems, VNFs, CNFs, etc. that maintain routing and/or network topology information associated with the 5GC. For example, NRF 809 may maintain and/or provide Internet Protocol ("IP") addresses of one or more network functions, routes associated with one or more network functions, discovery and/or mapping information associated with particular network functions or network function instances (e.g., whereby such discovery and/or mapping information may facilitate the SBA), and/or other suitable information.

NEF 811 include one or more devices, systems, VNFs, CNFs, etc. that provide access to information, application programming interfaces ("APIs"), and/or other operations or mechanisms of the 5GC to devices or systems that are external to the 5GC. NEF 811 may maintain authorization and/or authentication information associated with such external devices or systems, such that NEF 811 is able to provide information, that is authorized to be provided, to the external devices or systems. Such information may be received from other network functions of the 5GC (e.g., as authorized by an administrator or other suitable entity associated with the 5GC), such as SMF 801, UPF 803, a CHF of the 5GC, and/or other suitable network function. NEF 811 may communicate with external devices or systems via DN 750 and/or other suitable communication pathways.

Figure 9:
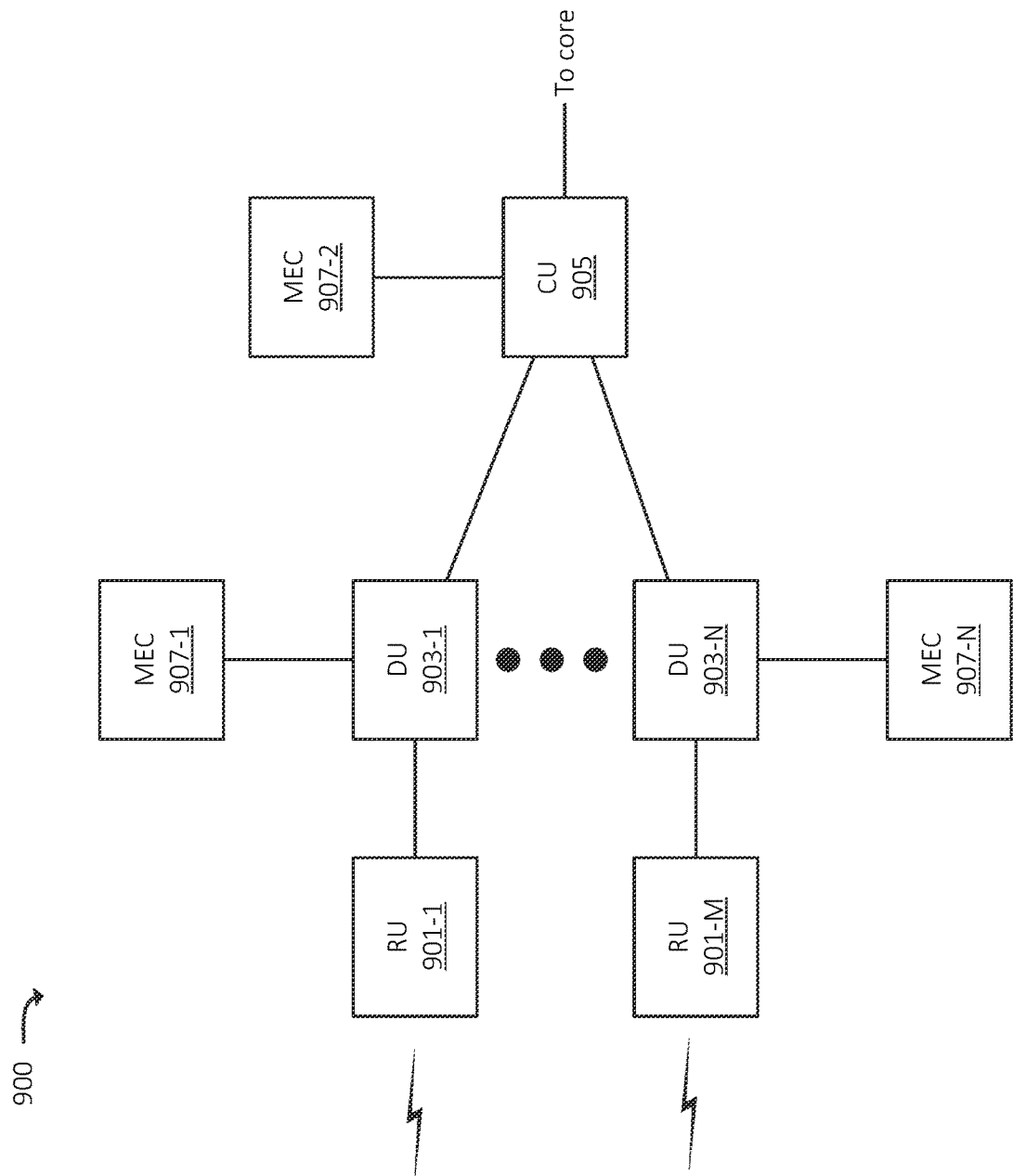
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 103 or some other RAN). In some embodiments, a particular RAN 103 may include one RAN environment 900. In some embodiments, a particular RAN 103 may include multiple RAN environments 900. In some embodiments, RAN environment 900 may correspond to a particular gNB 711 of RAN 103. In some embodiments, RAN environment 900 may correspond to multiple gNBs 711. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 805 and/or UPF 803). In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

As noted above, one or more elements of RAN environment 900 may, in some embodiments, be communicatively coupled to one or more MECs 827. For example, DU 903-1 may be communicatively coupled to MEC 827-1, DU 903-N may be communicatively coupled to MEC 827-N, CU 905 may be communicatively coupled to MEC 827-2, and so on. MECs 827 may include hardware resources (e.g., configurable or provisionable hardware resources) that may be configured to provide services and/or otherwise process traffic to and/or from UE 101, via a respective RU 901.

For example, DU 903-1 may route some traffic, from UE 101, to MEC 827-1 instead of to a core network via CU 905. MEC 827-1 may process the traffic, perform one or more computations based on the received traffic, and may provide traffic to UE 101 via RU 901-1. In some embodiments, MEC 827 may include, and/or may implement, some or all of the functionality described above with respect to UPF 803, AF 730, and/or one or more other devices, systems, VNFs, CNFs, etc. In this manner, ultra-low latency services may be provided to UE 101, as traffic does not need to traverse DU 903, CU 905, links between DU 903 and CU 905, and an intervening backhaul network between RAN environment 900 and the core network.

Figure 10:
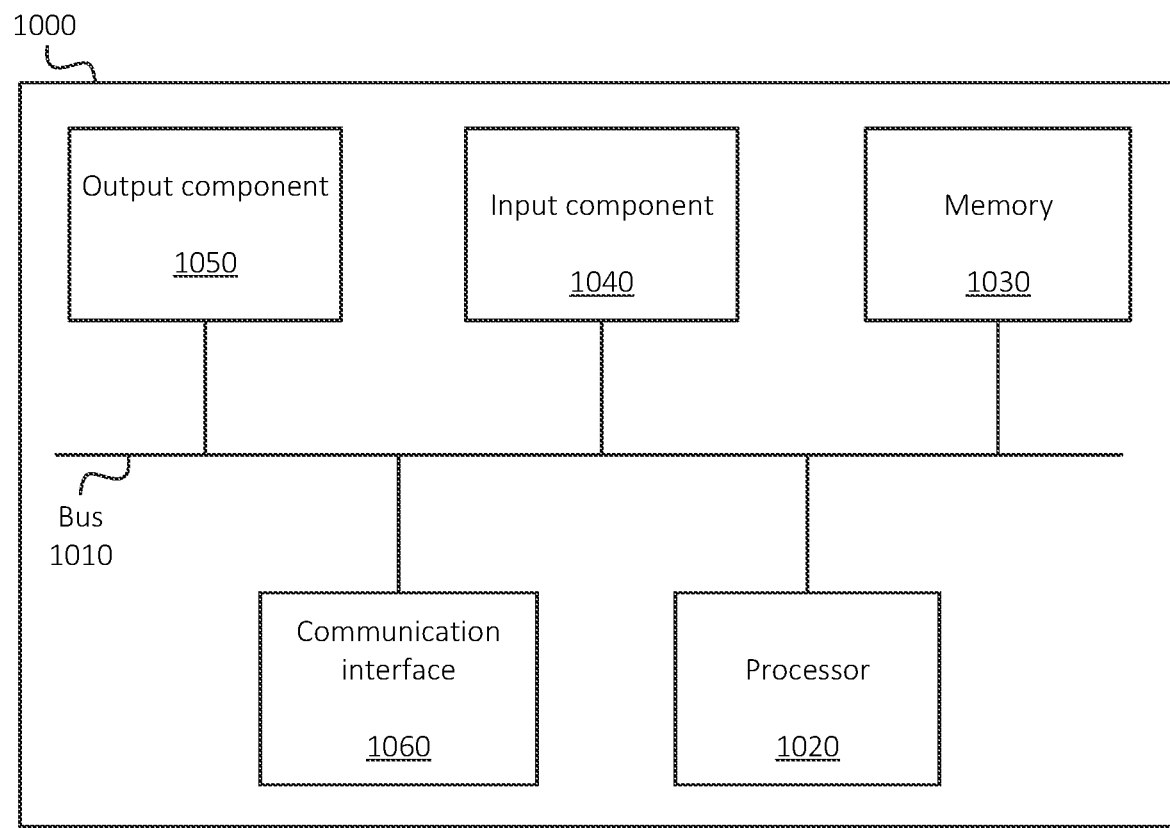
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive, from a policy element of a core network of a wireless network, a set of triggers associated with a plurality of radio frequency ("RF") bands implemented by a radio access network ("RAN") of the wireless network;
identify that a User Equipment ("UE") is connected to the RAN via a first RF band, of the plurality of RF bands, wherein the UE receives a first set of UE policies for communications between the UE and the core network of the wireless network based on the connection via the first RF band;
identify a subsequent connection of the UE to the RAN via a second RF band, of the plurality of RF bands;
identify that a particular trigger, of the set of triggers, is satisfied based on the subsequent connection of the UE to the RAN via the second RF band; and
indicate, to the policy element, that the particular trigger has been satisfied, wherein the policy element outputs a second set of UE policies for communications between the UE and the core network of the wireless network based on the satisfaction of the particular trigger.

2. The device of claim 1, wherein the policy element includes a Policy Control Function ("PCF").

3. The device of claim 2, wherein the one or more processors are configured to:
output an Npcf_UEPolicyControl_Create message to the PCF based on identifying that the UE is connected to the RAN via the first RF band.

4. The device of claim 3, wherein the Npcf_UEPolicyControl_Create includes a request for the set of triggers.

5. The device of claim 1, wherein the one or more processors are further configured to:
receive the first and second sets of UE policies; and
forward the first and second sets of UE policies to the UE.

6. The device of claim 1, wherein the first set of UE policies includes a first set of UE Route Selection Policy ("URSP") rules, and wherein the second set of UE policies includes a second set of URSP rules.

7. The device of claim 1, wherein the communications between the UE and the core network include at least one of:
one or more communication sessions between the UE and a User Plane Function ("UPF"), or
one or more communication sessions between the UE and a Packet Data Network ("PDN") Gateway ("PGW").

8. A non-transitory computer-readable medium, storing a plurality of processor-executable instructions to:
receive, from a policy element of a core network of a wireless network, a set of triggers associated with a plurality of radio frequency ("RF") bands implemented by a radio access network ("RAN") of the wireless network;
identify that a User Equipment ("UE") is connected to the RAN via a first RF band, of the plurality of RF bands, wherein the UE receives a first set of UE policies for communications between the UE and the core network of the wireless network based on the connection via the first RF band;
identify a subsequent connection of the UE to the RAN via a second RF band, of the plurality of RF bands;
identify that a particular trigger, of the set of triggers, is satisfied based on the subsequent connection of the UE to the RAN via the second RF band; and
indicate, to the policy element, that the particular trigger has been satisfied, wherein the policy element outputs a second set of UE policies for communications between the UE and the core network of the wireless network based on the satisfaction of the particular trigger.

9. The non-transitory computer-readable medium of claim 8, wherein the policy element includes a Policy Control Function ("PCF").

10. The non-transitory computer-readable medium of claim 9, wherein the plurality of processor-executable instructions further include processor-executable instructions to:
output an Npcf_UEPolicyControl_Create message to the PCF based on identifying that the UE is connected to the RAN via the first RF band.

11. The non-transitory computer-readable medium of claim 10, wherein the Npcf_UEPolicyControl_Create includes a request for the set of triggers.

12. The non-transitory computer-readable medium of claim 8, wherein the plurality of processor-executable instructions further include processor-executable instructions to:
receive the first and second sets of UE policies; and
forward the first and second sets of UE policies to the UE.

13. The non-transitory computer-readable medium of claim 8, wherein the first set of UE policies includes a first set of UE Route Selection Policy ("URSP") rules, and wherein the second set of UE policies includes a second set of URSP rules.

14. The non-transitory computer-readable medium of claim 8, wherein the communications between the UE and the core network include at least one of:
one or more communication sessions between the UE and a User Plane Function ("UPF"), or
one or more communication sessions between the UE and a Packet Data Network ("PDN") Gateway ("PGW").

15. A method, comprising:
receiving, from a policy element of a core network of a wireless network, a set of triggers associated with a plurality of radio frequency ("RF") bands implemented by a radio access network ("RAN") of the wireless network;
identifying that a User Equipment ("UE") is connected to the RAN via a first RF band, of the plurality of RF bands, wherein the UE receives a first set of UE policies for communications between the UE and the core network of the wireless network based on the connection via the first RF band;
identifying a subsequent connection of the UE to the RAN via a second RF band, of the plurality of RF bands;
identifying that a particular trigger, of the set of triggers, is satisfied based on the subsequent connection of the UE to the RAN via the second RF band; and
indicating, to the policy element, that the particular trigger has been satisfied, wherein the policy element outputs a second set of UE policies for communications between the UE and the core network of the wireless network based on the satisfaction of the particular trigger.

16. The method of claim 15, wherein the policy element includes a Policy Control Function ("PCF").

17. The method of claim 16, further comprising:
outputting an Npcf_UEPolicyControl_Create message to the PCF based on identifying that the UE is connected to the RAN via the first RF band, wherein the Npcf_UEPolicyControl_Create includes a request for the set of triggers.

18. The method of claim 15, the method further comprising:
receiving the first and second sets of UE policies; and
forwarding the first and second sets of UE policies to the UE.

19. The method of claim 15, wherein the first set of UE policies includes a first set of UE Route Selection Policy ("URSP") rules, and wherein the second set of UE policies includes a second set of URSP rules.

20. The method of claim 15, wherein the communications between the UE and the core network include at least one of:
one or more communication sessions between the UE and a User Plane Function ("UPF"), or
one or more communication sessions between the UE and a Packet Data Network ("PDN") Gateway ("PGW").

\* \* \* \* \*